United States Patent Office 3,457,864
Patented July 29, 1969

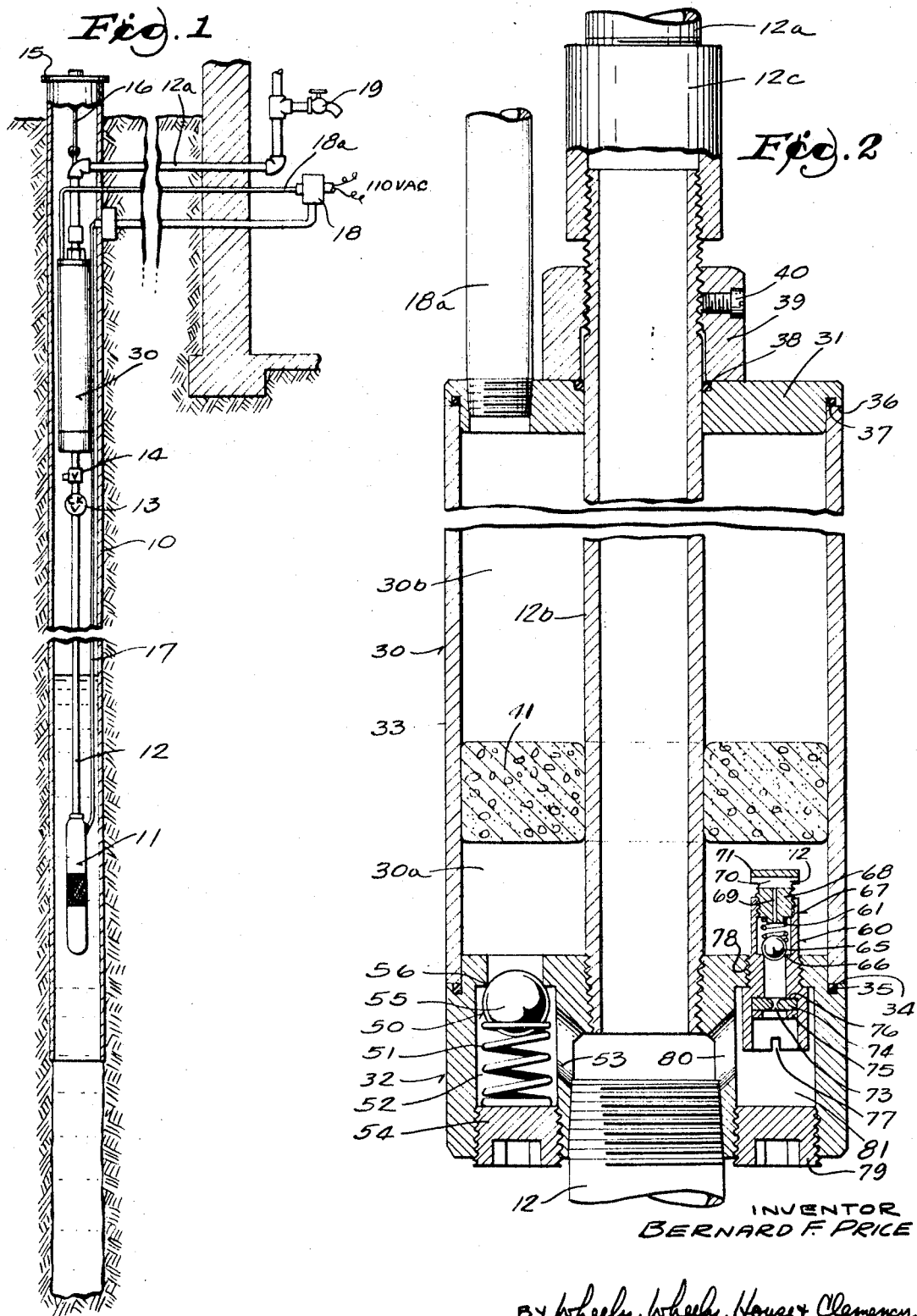

3,457,864
PRESSURE CONTROL FOR INSTALLATION IN WELLS
Bernard F. Price, 424 N. Division St.,
East Troy, Wis. 53120
Filed May 1, 1967, Ser. No. 635,189
Int. Cl. F04b *13/02, 17/06, 49/02*
U.S. Cl. 103—6                    15 Claims

ABSTRACT OF THE DISCLOSURE

A plumbing system has an air-water pressure chamber having a pressure switch to turn a water pump on and off according to low and high pressure limits, has a pressure actuated one-way water inlet valve which requires greater than the normal system operating pressure to open it, the valve being further provided with a restricted orifice and means to divert the flow to enter the chamber horizontally to avoid disturbing the air-water interface or cocking a buoyant separator between the air and water. The outlet from the chamber to the plumbing system is a one-way valve. A pressure relief valve may be provided between the pump and the chamber to relieve excess pressure, with the water returning to the well. The size of the chamber is such, due to the valving, that it may be installed as an annulus about the suspended water pipe within the well casing above the pump, eliminating the need for a large separate pressure regulation tank.

Background of the invention

It has long been thought desirable to eliminate the large pressure regulation tank containing water and a compressed air cushion, which is required in well systems to keep the high and low pressures of the system within reasonable bounds and to regulate the length of time the pump operates. In a standard system today, the pump supplies water to a water line which either is connected in series with the pressure regulating tank or has a branch line connected to the tank, which usually has a capacity of not less than 40 gallons. Beyond the tank the plumbing line is continued to the outlets where water is used, such as faucets. The tank is partially filled with water, and the remainder is filled with air which is trapped and compressed by the water. A pressure switch communicates with the air and shuts the pump off when the pressure in the tank rises to a pre-determined value, and turns the pump on when it falls to a pre-determined value. Between the two pre-determined pressures the air provides energy to force water out of the tank and through the plumbing system when a faucet is opened, until such time as the pressure switch reaches the pre-determined low pressure and turns on the pump. The pump is capable of supplying water at pressures much higher than the pre-determined high pressure of the pressure switch, in most instances. If the amount of water being used is small, the pump will supply more water than is needed and the pressure will rise toward the maximum of which the pump is capable, raising the pressure in the pressure tank relatively quickly to a level which actuates the pressure switch to shut off the pump, whereupon the cycle will be repeated. Only if substantially the full output of the pump is being used at the faucets will the pressure remain low enough so that the pump will continue to run. Thus the cycle of the pump will be longer or shorter depending on the flow rate of water being drawn at any particular time. If there were a pressure switch but no pressure regulation tanks, the pressure would drop substantially to zero when a faucet was opened and then when the pump turned on would immediately rise to whatever pressure the pump could supply at that rate of flow. In the case of low flow rates and high pressures this could damage water closet valves and even ordinary faucets, and the pump would then immediately be turned off because of the high pressure. The system would thus oscillate between full pressure and substantially none, and the motor would turn on and off rapidly, running mostly on the starting windings and overheating. No one has seriously proposed such a system but a decrease in the size of the pressure control tank approaches this system more or less according to the size of the tank. Thus it is essential to have a relatively large tank to attain reasonable pressure regulation with such a system. The patents to Kent 2,237,601, Dodd 2,318,066, Patterson et al. 2,787,220, Carlson 2,450,-781 and Kellog 2,445,437 relate to such systems.

The closest known patents to my device are Carpenter 2,708,881 and Bliss 2,911,916 which disclose flow responsive valves rather than a pressure responsive valve between the pressure tank and the water line to provide a controlled rate of filling the pressure tank, thus avoiding some of the disadvantages of such a tank.

Summary of the invention

My invention is characterized by a very small pressure chamber, preferably suspended within the well casing, and means to delay filling of the chamber until substantial time has passed and preferably until water use ceases, as by a pressure responsive valve between the tank and the water line, with the pressure set higher than the operating pressure of the system when the pump is running and only a small quantity of water is being drawn at the faucet, and by a spring-loaded check valve between the pressure chamber and the water line to permit water to leave the tank freely when the pressure differential between the water line and the pressure chamber is greater than the biasing force of the spring. A conventional check valve is preferably used between the chamber and the pump to prevent water from draining out of the system and my invention includes an optional pressure relief valve between the chamber and the pump to relieve water at excessively high pressure and dump it back into the well. The pressure relief valve is set at a higher pressure than the pressure controlled valve which admits water to the chamber. The chamber is of a size to fit around the water pipe within the well casing. The chamber volume is very small relative to the standard pressure tank due to the operating characteristics of my system.

Preferably a separator is used between the water and the air in the pressure control tank, as for instance an annular foam disc, in order to help prevent the absorption of the air cushion in the water, with consequent destruction of the air cushion. Air re-supply means is not usually needed because my inlet valve has means to provide a smooth flow of water into the tank in a horizontal direction, so as not to disturb the annular disc, and the interface between the air and the water is very limited in area. Thus an effective air cushion is maintained without the necessity for complex mechanism to add air to the system. However, my system is not incompatible with such mechanism if desired. The invention resides in the coordination between the means which delays admission of water from the water line to the tank, the check valve which freely passes water out of the tank when a given pressure differential is exceeded, and the optional relief valve which dumps water back into the well. A subsidiary invention is the arrangement of the parts for easy adjustment or repair.

Drawing

FIGURE 1 is a vertical cross-sectional view of a well with the device of my invention installed therein.

FIGURE 2 is a vertical cross-sectional view of the device of my invention, greatly enlarged with respect to the showing in FIGURE 1.

Description

The device of my invention is installed in the well casing 10 of a conventional well, which is provided with a pump 11 suspended from a water pipe 12 which carries the water from the pump upwardly to my pressure chamber 30 and then section 12a carries the water to the point of use. A pipe 12b carries the water through my device and is connected to section 12a by coupling 12c. A check valve 13 may be provided to prevent water from draining from the system back into the well, and in accordance with my invention a pressure relief valve 14 may be provided with an outlet, within well casing 10, to limit excessive pressure in the system should such pressure develop, while keeping the excess water from causing a problem of disposal and further keeping said water available for use. The nature of such valves is well known and the specific structure is accordingly not shown. The well casing is further provided with a cover 15 and with conventional suspension means 16 for supporting the pump 11, the pipe 12, and the associated parts of my invention which are to be described. The pump is furnished with electrical energy by means of a cable 17, the electricity being turned on and off by a pressure switch 18. A faucet 19 is illustrative of any device which may draw water from supply pipe 12a.

The parts of my novel device include the chamber 30 which is preferably coaxial with a supply pipe section 12b extending through the upper head 31 and threaded into the lower head 32. Supply pipe 12 between pump 11 and chamber 30 is also threaded into lower head 32 of tank 30. Supply pipe 12b through the tank 30 is threaded into a coupling 12c at its upper end, coupling 12c being threaded in turn to the downward extension of pipe 12a between the well and the point of use. Many structures are known for direcing the flow of water from a vertical pipe in the well casing outwardly to a horizontal pipe extending to the point of use and for supporting such structures within a well casing. These form no part of my invention, and the drawings herein do not illustrate any particular one of them, but are intended to schematically represent any such system found appropriate. Means for carrying the electrical connections from the pressure switch 18, regardless of location, to pump 11 are also well known and again the drawings are not intended to represent any particular such system but to be illustrative of the fact that any such system which is appropriate is usable with the device of my invention. Likewise, the pressure switch 18 is conventional and its location is a matter of choice depending on the size, shape, and corrosion resistance characteristics. It could be in the well, if adequately protected. The only requirement is that the pressure upon which it operates be the pressure within chamber 30, whenever the switch is mounted.

It will be seen from FIG. 2 that the support of chamber 30 is derived from the threaded connection between pipe 12b and the bottom head 32 of the chamber.

Chamber 30 consists of a cylindrical sidewall portion 33, a bottom head portion 32 which supports the cylindrical sidewall 33 on a shoulder 34 which is grooved to receive an O-ring 35 to seal the joint, and a top head member 31 which is supported on sidewall 33 on a shoulder 36 which is grooved to receive an O-ring 37 to seal the joint. An O-ring 38 seals the joint between head member 31 and the central water supply pipe 12b, and a threaded ring 39 is screwed onto the end of pipe 12b and has an unthreaded lower skirt portion to apply pressure between head 31 and lower head 32, which is threaded into the other end of pipe 12b, to securely assemble the chamber 30. A set screw 40 locks the ring 39 against accidental displacement. A pipe 18a is threaded into an opening in upper head 31 to provide communication between the air space 30b of chamber 30 and pressure switch 18. The air space 30b of chamber 30 is separated from the water space 30a by an annular ring 41 which may desirably be formed of foam, plastic, or other buoyant material, and which has a central opening of sufficient size to receive pipe 12b and an outer diameter of a size to be received within sidewall 33 of chamber 30, the dimensions being such as to afford a freely sliding movement of annulus 41 within chamber 30. As water is withdrawn and replaced within space 30a the air in space 30b will thus expand and be compressed without a large area of surface contact between them. Means to limit turbulence at the remaining interface are described later.

The lower head 32 is provided with a ball check valve 50 which is lightly loaded by a spring 51 to remain closed at all times unless the pressure in water space 30a and air space 30b exceeds the pressure in water supply line 12–12b. The ball check valve chamber 52 is provided with a passageway 53 which opens into the space between the ends of pipes 12 and 12b of the water line, and thus affords communication with the water line. Water may flow out of chamber 30, but cannot enter by that route, due to the one-way valve 50. A screw-threaded plug 54 serves as a closure for ball check valve chamber 52 and also provides a means for assembling ball check valve 50 and, if need be, for adjusting the pressure on spring 51.

Another ball check valve 60 in lower head 32 is provided with a ball 65 biased by a spring 61 against a seat 66 in a direction to permit water to enter space 30a of tank 30 but not to leave it. Valve 60 is contained in a valve body 67, within the upper end of which is a threaded plug 68 which may be screwed axially into body 67 to adjust the compression of spring 61, and thereby to adjust the pre-set pressure differential which actuates ball check valve 60 to permit water to enter the water space 30a of tank 30. A very small orifice 69 in plug 68 allows water passing ball 65 to enter space 30a. A lateral slot 70 intersects orifice 69. The slot 70 is capped by a closure member 71, leaving openings 72 at each end of the slot (or slots if more than two openings 72 are desired). The area of openings 72 is substantially greater than the opening of orifice 69 so that the water passes through said openings at reduced speeds and in a lateral plane, to prevent disturbance of annulus 41 which might either tilt it in the annular space between pipe 12b and sidewall 33 or cause excessive absorption of air into the water at the interface between the air and the water.

Valve 60 is provided with a slightly larger flow restricting orifice 73 which is the center opening of a compressed O-ring 74 held in place by means of retaining ring 75 against shoulder 76. The valve body 67 is provided with a spanner slot 77 or other means to afford purchase to unscrew the valve body 67 from threaded opening 78 in lower head member 32. A plug 79 provides access for assembling and disassembling valve 60, and for removal of the valve to adjust the pressure at which the valve opens. The latter adjustment is effected by removing valve body 67 from lower head 32 as a unit, all parts above threaded opening 78 being of a diameter to pass therethrough, after which closure 71 is removed from plug 68, exposing slot 70 which may be used as a screwdriver slot to turn plug 68 in or out of valve body 67. This adjusts the compression of spring 61. Thus the valve may be set at a pressure higher than the normal operating pressure of the system when water is being withdrawn but lower than the preset pressure at which valve 14 will dump water back into the well casing to limit the maximum pressure of the system. A passage 80 communicates between the valve chamber 81 and the space between the end of pipe 12 and the end of pipe 12b.

In operation, water passing through pipe 12 from the pump to the point of use cannot enter chamber 30a past ball 55 because the bias of spring 51 to close ball 55 on its seat 56 is augmented by the pressure of water within pipes 12 and 12b. The water cannot enter space 30a through orifices 73 and 69, or past valve ball 65, unless the pressure in pipes 12 and 12b and valve chamber 81 is greater than the preset bias of spring 61. When the water is turned off, the bias of spring 61 is exceeded by the water pressure which opposes the spring and water passes first through limited orifice 73, then past ball 65 and seat 66, then through still more limited orifice 69, then through slot 70 and out the openings 72 at the ends of slot or slots 70 to enter water space 30a in a lateral direction, gently displacing floating annulus 41 upwardly and compressing the air in air space 30b until duct 18a communicates sufficient pressure to pressure switch 18 to actuate the switch to break the connection between the electric line and pump 11 via electrical cable 17, at which point the pressure in the system remains stable, being retained at the lower end by check valve 13 and at the service end by various faucets and other valves 19. Under some circumstances a flow restriction 69 may be used without valve ball 65, in which case the structure may be simplified, the delay in filling being due to the flow restriction which also prevents substantial diversion of water to chamber 30 and thus stabilizes the pressure.

My pressure chamber 30 is small enough to be accommodated within well casing 10 and suspended from support means 16 owing to my special delay system, which gives the system an entirely different mode of operation than that heretofore known. This mode of operation is characterized by a very rapid drop in pressure as water is first withdrawn from the system, to the pressure at which the pressure switch 18 activates pump 11, and an immediate rise to a stable pressure when the pump is activated. The pressure is then substantially stable at whatever pressure can be maintained by the pump in view of the amount of water being drawn by the user. In most cases it will be just below the maximum pressure permitted by the relief valve, rather than substantially below it, because there is no substantial diversion of water from the water system to fill the 40-gallon pressure tank, as found in most systems. When the user turns off faucet 19 the pressure in line 12 will rise above the normal operating pressure and the small pressure tank 30 will reach pump shut-off pressure. At the same time any excess of water over that which can be admitted through orifice 69 will be dumped back into the well by pressure relief valve 14, thus limiting the system pressure to the pressure set at valve 14 while the chamber 30 finishes being charged. Chamber 30 has a capacity of only a few gallons, and that volume is partially occupied by an air cushion, so that the filling time is brief despite the restricted flow. It will be seen that because there is no large pressure tank to be filled by diverting water from the system while the user is drawing water, and because of the restricted orifice into the pressure chamber and pressure controlled valve 60, the pressure remains substantially constant while the use of water continues. It will not drop very much below the maximum system pressure unless more water is drawn by the user than the pump is capable of supplying at such pressure. This is an uncommon occurrence and even if it does occur, the pressure will be stable at whatever value the pump can maintain, rather than fluctuating. The pressure will only rise above the preset pressures effective to actuate valves 14 and 60 if a very tiny quantity of water is being used, in which case the tank will fill through the restricted orifice 69 of valve 60 while the user is withdrawing water, but the diversion is too slight to substantially affect the pressure, even in a situation where the user is drawing such a small quantity of water that the pump is capable of supplying many times the water needed at the relatively high pressure.

By contrast, in normal operation a conventional system having a 40-gallon or larger pressure tank experiences a rather gradual drop in pressure when the water is turned on until the large air cushion in the tank expels sufficient water into the system to drop the pressure to the minimum pre-set pressure for the pressure switch. The pump then switches on and supplies water both to the 40-gallon tank and to the open faucet. The tank is open to water supply line, and consequently the pressure in the supply line is set by the tank pressure and rises gradually until the tank is filled and the pump shuts off, when the cycle repeats. It may repeat several times during a single water use.

Thus in a conventional system if water is drawn for more than a moment the pressure will vary substantially during the use of the water making it difficult to maintain a constant flow.

What is claimed is:

1. In the combination comprising a source of water, a conduit extending from said source of water to a point of use, a water supply means adapted to force water from said source of water into said conduit, a first valve adapted to control withdrawal of water from said conduit, pressure storage means communicating with said conduit and containing a body of water and a body of gas adapted to be compressed by said water when said water supply means supplies water to said conduit under pressure, and a pressure responsive switch adapted to initiate a supply of water from said water supply means when said gas attains a pre-set minimum pressure and to terminate the supply of water from said water supply means when said gas attains a pre-set maximum pressure, the improvement comprising delay means between said conduit and said pressure storage means adapted to restrict admission of water to said pressure storage means for a substantial period after said first valve is opened whenever said first valve is opened, and means adapted to permit free egress of water from said storage means to said conduit, said delay means comprising a second valve adapted to open only when a pre-set pressure is exceeded in said conduit, said pre-set pressure being above the pressure normally attained in said conduit when said first valve is open.

2. The device of claim 1 in which said delay means comprises a flow restricting orifice adapted to limit the flow into the pressure storage means to a very small percentage of the maximum flow through said conduit.

3. The device of claim 1 in which a third valve means is adapted to release water from said pressure storage means to said conduit whenever the pressure in said pressure storage means exceeds the pressure in said conduit, said third valve means being adapted to prevent the entry of water from said conduit into said pressure storage means.

4. The device of claim 1 in which said source of water comprises a well, well has a casing and said pressure storage means is within the casing of said well.

5. The device of claim 1 in which water is admitted to the pressure storage means only in a direction substantially parallel to the surface of the water.

6. The device of claim 5 in which a single piece of buoyant material substantially separates the water in said pressure storage means from the gas in said pressure storage means.

7. The device of claim 1 in which said source of water comprises a well having a casing and said pressure storage means is within said well and substantially coaxial with a portion of said conduit which is also within said well casing.

8. The device of claim 1 in which said source of water comprises a well and said water supply means comprises a pump, and in which said pump, said pressure storage means, and the portion of said conduit extending between said pump and said pressure storage means are all suspended within the well.

9. In a fluid supply conduit, the improvement comprising a pressure storage means of small volume communicating with said conduit and containing a body of fluid and a body of gas adapted to be compressed by said fluid, means for supplying said fluid to said conduit under pressure, means for withdrawing said fluid from said conduit, means communicating with the body of gas within said pressure storage means and adapted to initiate supply of fluid by said fluid supply means when said body of gas reaches a pre-determined low pressure and to terminate supply of fluid by said fluid supply means when said gas reaches a pre-determined high pressure, means for releasing said fluid to said conduit whenever the pressure in said body of fluid exceeds the pressure in said conduit, said last-mentioned means being adapted to prevent entry of fluid into said body of fluid from said conduit, and means adapted to fill said body of fluid from said conduit, said last-mentioned means being adapted to delay complete replenishment of said body of fluid for a substantial time after the initiation of fluid supply to said conduit, said delay means comprising a second valve adapted to open only when a pre-set pressure is exceeded in said conduit, said pre-set pressure being above the pressure normally attained in said conduit when said first valve is open.

10. In the combination comprising a source of water, a conduit extending from said source of water to a point of use, a water supply means adapted to force water from said source of water into said conduit, a first valve adapted to control withdrawal of water from said conduit, pressure storage means communicating with said conduit and containing a body of gas adapted to be compressed by said water when said water supply means supplies water to said conduit under pressure, and a pressure responsive switch adapted to initiate a supply of water from said water supply means when said gas attains a pre-set minimum pressure and to terminate the supply of water from said water supply means when said gas attains a pre-set maximum pressure, the improvement comprising delay means between said conduit and said pressure storage means adapted to restrict admission of water to said storage means for a substantial period after said first valve is opened whenever said first valve is opened, and means adapted to permit free egress of water from said storage means to said conduit, said source of water comprising a well and said conduit lying in part within said well, and further comprising a pressure relief valve adapted to release water from said conduit into said well when a pre-set pressure is exceeded within said conduit, said pre-set pressure being higher than the pre-set pressure effective to cause said second valve to admit water to said pressure storage means.

11. In the combination comprising a source of water, a conduit extending from said source of water to a point of use, a water supply means adapted to force water from said source of water into said conduit, a first valve adapted to control withdrawal of water from said conduit, pressure storage means communicating with said conduit and containing a body of water and a body of gas adapted to be compressed by said water when said water supply means supplies water to said conduit under pressure, and a pressure responsive switch adapted to initiate a supply of water from said water supply means when said gas attains a pre-set minimum pressure and to terminate the supply of water from said water supply means when said gas attains a pre-set maximum pressure, the improvement comprising delay means between said conduit and said pressure storage means adapted to restrict admission of water to said pressure storage means for a substantial period after said first valve is opened whenever said first valve is opened, and means adapted to permit free egress of water from said storage means to said conduit, said source of water comprising a well and said water supply means comprising a pump, and in which said delay means comprises a second valve adapted to open only when a pre-set pressure is exceeded in said conduit, said pre-set pressure being above the pressure normally attained in said conduit when said first valve is open, said delay means further comprising a flow restricting orifice adapted to limit the flow into the pressure storage means to a very small percentage of the maximum flow through said conduit, a third valve means adapted to release water from said pressure storage means to said conduit whenever the pressure in said pressure storage means exceeds the pressure in said conduit, said third valve means being adapted to prevent the entry of water from said conduit into said pressure storage means, said conduit lying in part within said well, and further comprising a pressure relief valve adapted to release water from said conduit into said well when a pre-set pressure is exceeded within said conduit, said pre-set pressure being higher than the pre-set pressure effective to cause said second valve to admit water to said pressure storage means, said well having a casing and said pressure storage means is within the casing of said well, water being admitted to the pressure storage means only in a direction substantially parallel to the surface of the water, and a single piece of buoyant material substantially separating the water in said pressure storage means from the gas in said pressure storage means.

12. In the combination comprising a source of water, a conduit extending from said source of water to a point of use, a water supply means adapted to force water from said source of water into said conduit, a first valve adapted to control withdrawal of water from said conduit, a pressure storage means communicating with said conduit and containing a body of water and a body of gas adapted to be compressed by said water when said water supply means supplies water to said conduit under pressure, and a pressure responsive switch adapted to initiate a supply of water from said water supply means when said gas attains a pre-set minimum pressure and to terminate the supply of water from said water supply means when said gas attains a pre-set maximum pressure, the improvement comprising a second valve between said conduit and said pressure storage means adapted to admit water to said pressure storage means only when a pre-set pressure is exceeded in said conduit, said conduit being adapted to permit water to flow freely from said source and said storage means to said first valve at all times when said valve is open.

13. The device of claim 12 in which said source of water is a water well and said water supply means is a water pump, said well having a casing, a portion of said conduit means being within the casing of said well, said pressure storage means being within the casing of said well, said pressure storage means having an annular upper head sealed to said portion of said conduit within said well, sidewall means sealed to said top, and a bottom head sealed to said conduit and to said sidewall, and said conduit being in supporting relationship to said bottom head, sidewall, and top head of said pressure storage means, a separate portion of said conduit being in sealed depending relation to said bottom head, said bottom head being provided with a conduit portion connecting said supporting conduit to said depending conduit, said conduit means within said bottom head including a generally radially extending passage terminating in an axially extending chamber within said bottom head adapted to receive said second valve means.

14. The device of claim 13 in which a pair of said generally radial passageways and a pair of said axially extending chambers are provided in said bottom head, one of said chambers being provided with check valve means communicating with the water space of said pressure storage means and adapted to release water therefrom into said conduit whenever the pressure in said pressure storage means exceeds the pressure in said conduit.

15. The device of claim 13 in which said axial chamber extends through the top and bottom surfaces of said bottom head, the opening through the bottom surface of the said bottom head being sealed with a removable plug, the opening in said top surface of said head being in sealed removable engagement with a valve body containing said second valve means, said second valve means including a flow restriction at the entrance to said valve from said conduit, a valve seat having an opening therethrough, a ball adapted to seal said opening, a compression spring having an end engaged with said ball, a seat for said compression spring upon which the other end of said compression spring is seated, said compression spring seat being threadedly engaged with the valve body, an axially extending flow restricting orifice through said spring seat, a laterally extending slot in the upper end of said spring seat, and a closure threadedly engaged with the upper end of said spring seat, said closure having a length axially of said spring seat less than the axial length of the ends of said slot, the diameter of said closure, said spring seat, and said valve body all being less than the diameter of said axially extending chamber in said bottom wall of said pressure storage means whereby upon removal of said plug said valve may be removed bodily for servicing.

References Cited

UNITED STATES PATENTS

| | | | |
|---|---|---|---|
| 2,621,608 | 12/1952 | McIntyre | 103—25 |
| 2,847,939 | 8/1958 | Tubbs | 103—6 |
| 3,065,698 | 11/1962 | Andrews | 103—25 |
| 3,191,536 | 6/1965 | Taylor | 103—25 |
| 3,141,475 | 7/1964 | Guinard et al. | 103—25 |
| 3,295,450 | 1/1967 | Schonwald et al. | 103—25 |
| 3,363,572 | 1/1968 | Erck | 103—25 |

FOREIGN PATENTS 301,145  5/1915  Germany.

WILLIAM L. FREEH, Primary Examiner

U.S. Cl. X.R.

103—25; 137—209